TRANSISTOR DEFLECTION SYSTEM WITH LINEARIZING CIRCUIT

Filed Feb. 26, 1963

INVENTOR.
De Loss J. Tanner
BY Mueller & Aichele
Attys.

United States Patent Office 3,200,288
Patented Aug. 10, 1965

3,200,288

TRANSISTOR DEFLECTION SYSTEM WITH LINEARIZING CIRCUIT

De Loss J. Tanner, Bensenville, Ill., assignor to Motorola, Inc., Chicago, Ill., a corporation of Illinois Filed Feb. 26, 1963, Ser. No. 261,060
9 Claims. (Cl. 315—27)

Figures 1, 2:
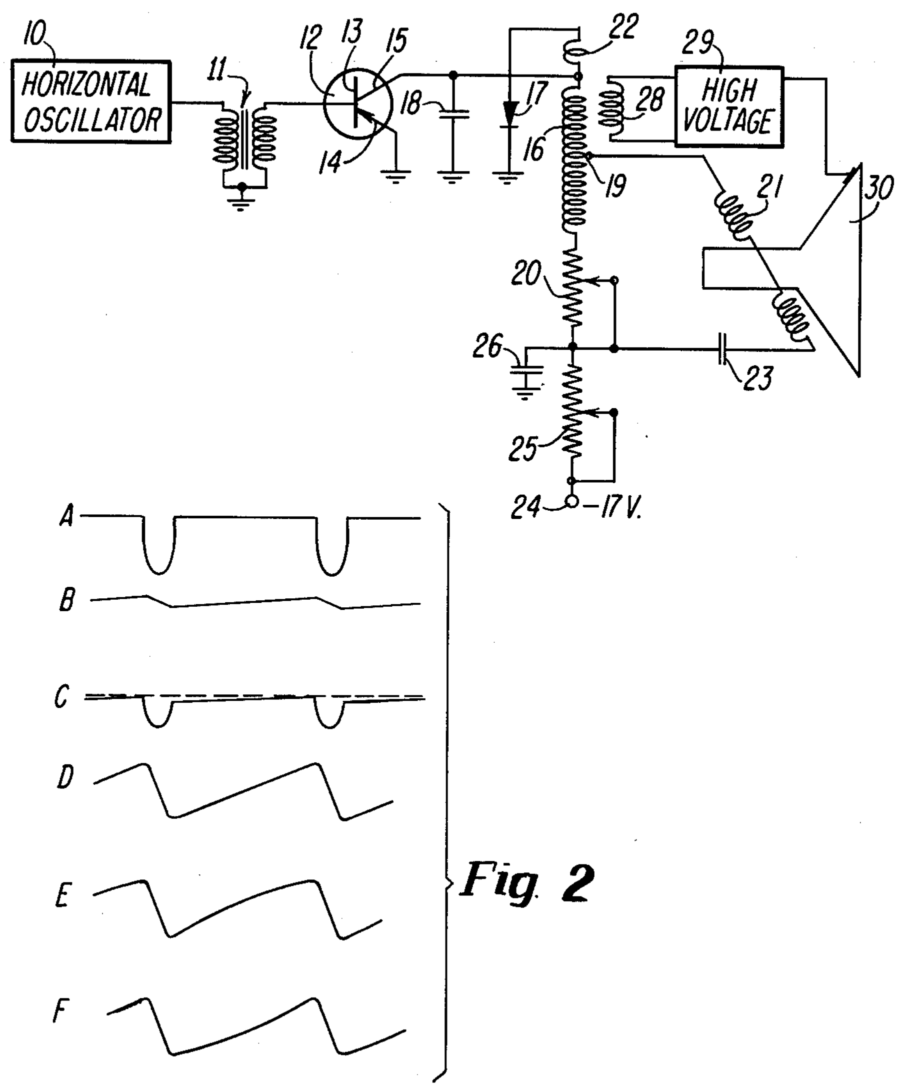

This invention relates generally to sweep or deflection systems for cathode ray tubes, and more particularly to a transistorized horizontal deflection system for use in television cameras or receivers and having linearity correction provisions.

In the design of television equipment, a problem has been encountered in providing simple and inexpensive horizontal deflection circuits having adequate linearity. This is important both in television cameras where very precise linearity is required, and in television receivers wherein pictures are generally produced on large screens. Accordingly accurate control of linearity is required in order to provide highly linear deflection current in some instances, and to provide a predetermined linearity characteristic in the deflection in other applications.

A transistor may be used efficiently in a horizontal deflection circuit as a switch that is turned on during the active portion of the scan (trace) and off during the blanked portion of the scan (retrace). This type of operation results in a pulse voltage waveform that has a constant or flat baseline during trace. However to compensate for yoke resistance and other losses, the voltage applied to the yoke should not have a constant baseline, but should have a rising or sawtooth component.

It is, therefore, an object of the present invention to provide a simple transistorized horizontal deflection circuit having the desired linearity characteristics.

Another object of this invention is to provide the correct waveform for linear deflection in a yoke, without affecting the transistor operation or the transistor's output waveform.

A feature of this invention is the provision of a transistor horizontal deflection circuit wherein the correctly altered waveform for the yoke is achieved by use of a tapped choke and adding only one resistor.

A further feature of the invention is the provision of a transistorized horizontal deflection output stage, including a transistor connected to a choke and rendered conducting by an oscillator operating at the horizontal frequency, to provide current to a horizontal deflection yoke coupled to a tap on the choke, with an unbypassed resistor in series with the choke controlling the linearity of the current developed in the yoke.

Another feature of the invention is the provision of a horizontal output circuit including a choke fed from the collector electrode of the transistor, with a variable linearity resistor and a bypassed variable width resistor connected in series with the choke to a bias potential supply, and with the horizontal yoke being connected across a portion of the choke and the linearity resistor. The choke may be associated with windings and rectifiers to provide one or more direct current voltages, as may be required for operating the cathode ray tube with which the horizontal yoke is associated.

The invention is illustrated in the drawing wherein:

FIG. 1 is a circuit diagram of the horizontal deflection system of the invention; and FIG. 2 is a chart showing the wave forms of voltages and currents in the deflection system.

In practicing the invention there is provided a horizontal deflection system which may be used either for a television camera or a television receiver. The deflection system includes an oscillator operating at the horizontal frequency, and this may be controlled by a crystal in the television camera, or by the received synchronization pulses in a television receiver. The oscillator applies pulses at the horizontal frequency to the deflection output circuit which includes a transistor. The pulses are applied between the emitter and base electrodes of the transistor, and the collector and emitter electrodes are connected to the deflection yoke through an output circuit. The output circuit may include a damper diode connected to conduct during the first part of trace to supplement the transistor conduction, and a choke coil connected in series with a linearity control resistor to a potential supply. The resistor is unbypassed and may be fixed or adjustable depending upon whether fixed linearity, or controllable linearity, is required. A bypassed width control resistor may be connected in series with the linearity resistor for controlling the amplitude of current. The deflection coils are connected from a tap on the choke across a portion of the choke and the linearity resistor so that the sawtooth wave across the resistor is combined with the pulse wave from the transistor. The linearity resistor may be selected at a value providing the desired linearity, or may be made adjustable to provide linearity control.

The horizontal deflection system in accordance with the invention is illustrated in FIG. 1 as including a horizontal oscillator 10 coupled to the transistor output stage. As previously stated, the oscillator 10 may be a crystal controlled oscillator in a television camera, or may be an oscillator synchronized by horizontal synchronization pulses in a television receiver. The oscillator may include buffer and/or amplifier stages as may be required in a particular application. The horizontal oscillator 10 is connected through transformer 11 to the base electrode 13 of transistor 12. Pulses at the horizontal frequency are applied from the secondary winding of transformer 11 to render the transistor 12 conducting during the trace periods of the horizontal deflection wave. The emitter electrode 14 of transistor 12 is connected to ground, and the collector electrode 15 thereof is connected to choke coil 16. A damper diode 17 is shown connected to winding 22 which provides a slightly higher pulse amplitude than that at the collector electrode 15. The diode 17 may not be required in certain applications, and may have characteristics so that it can be connected directly to the collector electrode so that the winding 19 may be eliminated. A capacitor 18 may also be connected between the collector and emitter electrodes to resonate the choke 16. For some applications the choke may be constructed with sufficient inductance and/or capacitance so that the capacitor 18 is unnecessary.

Choke 16 has a tap 19 intermediate the outer terminals thereof. Variable resistor 20 is connected in series with choke 16, and the deflection coils 21 are connected in series with capacitor 23 from tap 19 on choke 16 and across the resistor 20.. The resistor 20 provides linearity control for the current in the deflection coils or yoke 21. The energizing circuit for the transistor 12 is completed from the negative 17 volt terminal 24 through width resistor 25, which is bypassed by capacitor 26. The width resistor 25 may be variable to thereby control the horizontal size or amplitude of the scan of the horizontal deflection.

An additional winding 28 may be coupled to the choke winding 16 for energizing a high voltage circuit 29 to provide one or more high voltage potentials to the cathode ray tube 30, with which the deflection coils 21 are associated. Choke 16 and coil 28 may form an autotransformer, or may be isolated windings of a transformer. The high voltage circuit may include rectifiers connected in known circuits.

The voltage at the collector electrode of transistor 12 is a pulse wave as shown by curve A in FIG. 2, wherein the trace portions are of constant amplitude, or flat. As previously stated, to compensate for losses such as the loss resulting from resistance in the yoke, the voltage applied to the yoke should rise slightly during the trace. The unbypassed resistor 20 in series with the choke 16 forms an integrating circuit which provides a tilt or sawtooth wave as is shown by curve B in FIG. 2. This voltage is combined with the collector voltage to provide the voltage across the yoke.

To provide the desired deflection current, the yoke must be connected to a tap on the choke so that the voltage wave form applied to the yoke is altered. This cannot take place at the collector electrode because this electrode is effectively grounded during each trace of the wave. The voltage applied across the yoke is shown by curve C in FIG. 2. It is to be noted that the voltage rises slightly during the trace period, this being illustrated by comparison of the solid line wave which represents a voltage rising as the trace proceeds with the dotted line which represents a fixed value. Curve D shows the yoke current produced when the resistor 20 in series with the choke 16 is selected so that the trace is linear. Curve E shows the results when the resistor 20 is shorted and the voltage applied during the trace is flat. In such case the yoke curent rises too fast at the beginning of the trace and then rounds off and is compressed at the end of the trace. Curve F shows the effect of the use of a resistor 20 which provides over-compensation, so that the yoke current rises very slowly at the beginning of the trace and then rises rapidly at the end of the trace.

In a circuit which has been used in a television camera, the value of resistor 20 for providing a highly linear trace is of the order of three ohms. When a resistor having a value of 10 ohms is used, the waveform as shown in curve F was provided. The resistor 20 can be a variable element as shown to provide a linearity control or it may be a fixed unit selected to provide the desired linearity characteristics.

It is pointed out that coupling capacitor 23 may have an effect on the linearity of the deflection, in a manner which is known. When the circuit is used for receivers having flat face wide angle picture tubes, and size of capacitor 23 may be reduced to a value that is series resonant with the yoke at a frequency below the horizontal frequency. This causes the yoke current to be S shaped to compensate for the greater distance the beam has to travel to reach the edges of the picture tube than to reach the center. The capacitor 23 may be connected to ground rather than to the junction of resistors 20 and 25 as shown, wherein the path to ground is completed through capacitor 26.

The deflection output circuit of the invention can be used with known width and centering control circuits, such as the width control circuit illustrated. It can also be used in combination with other known linearity control circuits as may be required for a particular application. For example, a high-Q coil may be connected in series with the yoke to cooperate with the resistor 20 to provide an extremely high degree of linearity.

The invention therefore provides a simple transistorized output circuit for a deflection system for a cathode ray tube wherein the linearity can be controlled to provide the desired characteristics. The control can be set by selecting the correct value of resistance, or an adjustable control may be used to provide a control of the horizontal sweep linearity.

I claim:

1. A generator system for providing current for the horizontal deflection coils of a cathode ray tube used in television apparatus including in combination, oscillator means for providing pulses recurring at the horizontal deflection frequency, a transistor having base, emitter and collector electrodes, means coupling said base and emitter electrodes to said oscillator, direct current potential supply means, a choke coil having first and second terminals and an intermediate tap, a resistor having first and second terminals with said first terminal thereof connected to said second terminal of said coil, means connecting the deflection coils between said tap on said choke coil and said second terminal of said resistor, and circuit means connecting said potential supply means between said collector and emitter electrodes of said transistor, said circuit means providing a path for direct current flow through said coil and said resistor and extending from said first terminal of said coil to said second terminal of said resistor, said transistor being rendered conductive by said pulses applied thereto from said oscillator means to apply a current wave of sawtooth form through the deflection coils.

2. A generator system for providing current for the horizontal deflection coils of a cathode ray tube including in combination, oscillator means for providing pulses recurring at the horizontal deflection frequency, a transistor having input output and common electrodes, means coupling said input and common electrodes to said oscillator, direct current potential supply means, a choke coil having first and second terminals and an intermediate tap, resistor means having first and second terminals with said first terminal thereof connected to said second terminal of said coil, circuit means connected to said first terminal of said coil and said second terminal of said resistor means and providing a path for direct current flow through said coil and said resistor means from said potential supply means to said output and common electrodes of said transistor, and means connecting the deflection coils between said tap on said choke coil and said second terminal of said resistor means, said oscillator means applying pulses to said transistor for rendering the same conductive to provide a current wave of sawtooth form through the deflection coils.

3. A generator system for providing current for the horizontal deflection coils of a cathode ray tube including in combination, oscillator means for providing pulses recurring at the horizontal deflection frequency, a transistor having input, output and common electrodes, means coupling said input and common electrodes to said oscillator, direct current potential supply means, a choke coil having first and second terminals and an intermediate tap, resistor means having first and second terminals with said first terminal thereof connected to said second terminal of said coil, circuit means connected to said first terminal of said coil and said second terminal of said resistor means and providing a direct current path extending through said coil and said resistor means in series from said potential supply means between said output and common electrodes of said transistor, and means connecting the deflection coils between said tap on said choke coil and said second terminal of said resistor means, said oscillator means applying pulses to said transistor for rendering the same conductive to provide a current wave of sawtooth form through the deflection coils, said resistor means being variable for controlling the linearity characteristics of the trace portions of said sawtooth current wave.

4. A generator system for providing current for the horizontal deflection coils of a cathode ray tube including in combination, oscillator means for providing pulses recurring at the horizontal deflection frequency, a transistor having input, output and common electrodes, means coupling said input and common electrodes to said oscillator, direct current potential supply means, a coke coil having first and second terminals and an intermediate tap, resistor means having first and second terminals with said first terminal thereof connected to said second terminal of said coil, circuit means connected to said first terminal of said coil and said second terminal of said resistor means and providing a direct current path extending through said coil and said resistor means in series from said potential supply means between said output and common electrodes of said transistor, means connecting the deflection coils between said tap on said choke coil and second terminal of said resistor means, said oscillator means applying pulses to said transistor for rendering the same conductive to provide a current wave of saw tooth form through the deflection coils and means coupled to said choke coil to provide a direct current energizing potential for the cathode ray tube.

5. A generator system for providing current for the horizontal deflection coils of a cathode ray tube including in combination, oscillator means for providing pulses recurring at the horizontal deflection frequency, a transistor having base, emitter and collector electrodes, means coupling said base and emitter electrodes to said oscillator, direct current potential supply means, a choke coil having first and second terminals and an intermediate tap, resistor means having first and second terminal means connecting said first terminal of said resistor means to said second terminal of said coil, circuit means connected to said first terminal of said coil and said second terminal of said resistor means and providing a direct current circuit extending in series through said coil and resistor means from said potential supply means between said collector and emitter electrodes of said transistor, and means connecting the deflection coils between said tap on said choke and said second terminal of said resistor means, said transistor being rendered conductive by said pulses applied thereto from said oscillator means to apply a current wave of sawtooth form to the deflection coils, said resistor means being selected to provide a predetermined linearity charcteristic to the trace portions of said sawtooth wave.

6. A generator system for providing current for the horizontal deflection coils of a cathode ray tube including in combination, oscillator means for providing pulses recurring at the horizontal deflection frequency, a transistor having base, emitter and collector electrodes, means coupling said base and emitter electrodes to said oscillator, direct current potential supply means, a choke coil having first and second terminals and an intermediate tap, a resistor having first and second terminals with said first terminal thereof connected to said second terminal of said coil, circuit means connecting said potential supply means between said collector and emitter electrodes of said transistor, said circuit means providing a path for direct current flow through said coil and said resistor in series, and means connecting the deflection coils between said tap on said choke and said second terminal of said resistor, said transistor being rendered conductive by said pulses applied thereto from said oscillator means to apply a current wave of sawtooth form to the deflection coils, said resistor having a value such that the trace portions of said sawtooth wave are substantially linear.

7. A generator system for providing current for the horizontal deflection coils of a cathode ray tube including in combination, oscillator means for providing pulses recurring at the horizontal deflection frequency, a transistor having base, emitter and collector electrodes, means coupling said base and emitter electrodes to said oscillator, direct current potential supply means, a choke coil having first and second terminals and an intermediate tap, first resistor means having first and second terminals with said first terminal thereof connected to said second terminal of said coil, second resistor means, circuit means connecting said first terminal of said coil and said second terminal of said first resistor means in circuit with said second resistor means and said potential supply means between said collector and emitter electrodes of said transistor, capacitor means bypassing said second resistor means, and means connecting the deflection coils between said tap on said choke and said second terminal of said resistor means, said transistor being rendered conductive by said pulses applied thereto from said oscillator means to apply a current wave of sawtooth form to the deflection coils.

8. A generator system for providing current of sawtooth waveform for the horizontal deflection coils of a cathode ray tube including in combination, oscillator means for providing pulses recurring at the horizontal deflection frequency, a transistor having base, emitter and collector electrodes, means coupling said base and emitter electrodes to said oscillator, a diode, means connecting said diode to said emitter and collector electrodes with a polarity opposite to the polarity of the junction between said emitter and collector electrodes so that said diode conducts during the first part of the trace of the sawtooth wave, direct current potential supply means, a choke coil having first and second terminals and an intermediate tap, a resistor having first and second terminals, means connecting said first terminal of said resistor to said second terminal of said coil, circuit means connecting said potential supply means between said collector and emitter electrodes of said transistor, said circuit means providing a direct current path in series through said coil and said resistor, and means connecting the deflection coils between said tap on said choke and said second terminal of said resistor, said transistor being rendered conductive by said pulses applied thereto from said oscillator means to apply a current wave of sawtooth form to the deflection coils.

9. A generator system for providing current of sawtooth wave form, for the horizontal deflection coils of a cathode ray tube including in combination, oscillator means for providing pulses recurring at the horizontal deflection frequency, a transistor having input, output and common electrodes, means coupling said input and common electrodes to said oscillator, direct current potential supply means, a choke coil having first and second terminals and an intermediate tap, resistor means having first and second terminals, means connecting said first terminal of said resistor means to said second terminal of said coil, circuit means connecting said potential supply means between said output and common electrodes of said transistor, said circuit means providing a direct current path through said coil and said resistor means and extending from said first terminal of said coil to said second terminal of said resistor means, and means connecting the deflection coils between said tap on said choke and said second terminal of said resistor means, said transistor being rendered conductive by said pulses applied thereto from said oscillator means to develop a pulse voltage wave across said choke coil, said resistor means developing a sawtooth voltage wave thereacross and having a value such that the sawtooth voltage wave applied thereby to the deflection coils and the pulse voltage wave applied thereto by said choke coil produce a current wave in the deflection coils having substantially linear trace portions.

References Cited by the Examiner

UNITED STATES PATENTS 2,743,382 4/56 Lufkin ---------------- 315—27

OTHER REFERENCES

"IRE Dictionary of Electronics Terms and Symbols," Institute of Radio Engineers. New York 1961, p. 130.

DAVID G. REDINBAUGH, *Primary Examiner.*